United States Patent
Grosset et al.

(10) Patent No.: US 9,665,618 B2
(45) Date of Patent: May 30, 2017

(54) INFORMATION RETRIEVAL FROM A DATABASE SYSTEM

(71) Applicant: INTERNATIONAL BUSINESS MACHINES CORPORATION, Armonk, NY (US)

(72) Inventors: Robin N. Grosset, Ottawa (CA); Ramon L. H. Pisters, Weert (NL); Antonius G. P. Steijvers, Ell (NL); Franciscus J. J. Van Ham, Geldrop (NL)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 14/255,602

(22) Filed: Apr. 17, 2014

(65) Prior Publication Data

US 2014/0358963 A1 Dec. 4, 2014

(30) Foreign Application Priority Data

Jun. 3, 2013 (GB) .................................. 1309877.7

(51) Int. Cl.
*G06F 17/30* (2006.01)
(52) U.S. Cl.
CPC .. *G06F 17/30424* (2013.01); *G06F 17/30412* (2013.01); *G06F 17/30489* (2013.01); *G06F 17/30483* (2013.01); *G06F 17/30867* (2013.01)
(58) Field of Classification Search
CPC ......... G06F 17/30463; G06F 17/30424; G06F 17/30516; G06F 17/30389; G06F 17/30412; G06F 17/30442; G06F 17/30451; G06F 17/30454; G06F 17/30466; G06F 17/30477; G06F 17/30483; G06F 17/30; G06F 17/30592; G06F 17/30867; G06F 3/04842; Y10S 707/99931; Y10S 707/9994
See application file for complete search history.

(56) References Cited

U.S. PATENT DOCUMENTS 5,794,228 A * 8/1998 French .............. G06F 17/30324
5,794,229 A * 8/1998 French .............. G06F 17/30324
(Continued)

FOREIGN PATENT DOCUMENTS

EP 2555130 A1 2/2013
WO 0163483 A2 8/2001

OTHER PUBLICATIONS

Sugathan, et al., "Optimization of Horizontal Aggregation in SQL by Using K-Means Clustering", International Journal of Advanced Research in Computer Science and Software Engineering, May 2012, pp. 203-208, vol. 2, Issue 5.
(Continued)

*Primary Examiner* — Merilyn Nguyen
(74) *Attorney, Agent, or Firm* — Law Office of Jim Boice (57) ABSTRACT

A processor-implemented method retrieves information from a database system. A data query, which includes a specification of information to be retrieved from the database system, is generated. A first parameter specifying a condition to be met by the retrieved information is defined. A second parameter specifying one or more data reduction operations to be executed if the condition defined by the first parameter is not met is defined. The generated data query and the first and second parameters are then transmitted to the database system.

18 Claims, 3 Drawing Sheets

(56) References Cited

U.S. PATENT DOCUMENTS

| | | | | |
|---|---|---|---|---|
| 5,918,225 | A * | 6/1999 | White | G06F 17/30324 |
| 7,315,849 | B2 * | 1/2008 | Bakalash | G06F 17/30457 |
| 7,991,766 | B2 * | 8/2011 | Srinivasan | G06F 17/30489 |
| | | | | 707/714 |
| 8,290,933 | B2 | 10/2012 | Miao et al. | |
| 8,478,775 | B2 * | 7/2013 | Netz | G06F 17/30501 |
| | | | | 707/769 |
| 8,521,867 | B2 * | 8/2013 | Srinivasan | G06F 17/30412 |
| | | | | 707/770 |
| 2006/0080285 | A1 * | 4/2006 | Chowdhuri | G06F 17/30445 |
| 2009/0006346 | A1 * | 1/2009 | C N | G06F 17/30454 |
| 2010/0083147 | A1 | 4/2010 | Gaffney | |
| 2013/0013588 | A1 | 1/2013 | Dewar et al. | |

OTHER PUBLICATIONS

UK Intellectual Property Office, Search Report for GB Application No. 1309877.7, mailed Nov. 12, 2013.

* cited by examiner

INFORMATION RETRIEVAL FROM A DATABASE SYSTEM

BACKGROUND

This invention relates to the field of information retrieval, and more particularly to the retrieval of information from a database system for purposes such as data analysis.

Data analysis applications typically use a client system to display condensed or summarized views of large amounts of data stored in a centralized database system (such as a server for example). In retrieving the information to form such views, there is typically a trade-off between the following two variables: (i) the amount of data (e.g. the number of records) that will be returned in a response to a query/request for a particular view (which is typically unknown at the point of making the query/request); and (ii) the amount of resources the client system has to display the data (which is typically unknown by the server system at the time of retrieving the data).

When using existing database query languages, such as SQL or MDX, it is known to specify hard limits on the amount of data (e.g. the number of data items or records returned by the query). Some existing query constructs (such as "SET ROWCOUNT", "TOP N" or "FETCH FIRST N ONLY", for example) enable a client system to specify that only a subset of an entire result set should be returned to the client system. For data analysis purposes, such methods of limiting data are very crude, and they can potentially exclude large (and in some cases arbitrary) sections of the data from a query result. This can misrepresent the overall structure of a data set and can potentially lead to wrong data analysis conclusions being drawn.

For example, if one considers the following instance from a SALARIES table (shown as Table 1 below) stored in a database system, where a limited client system can only handle five (5) records at a time, the total number of records in the table may not be known at the time of generating a database query. Further, the total number of unique values in the person column may not be known.

TABLE 1

| Person | Department | Salary |
| --- | --- | --- |
| Anna | Management | 7 |
| Bob | Management | 5 |
| Claire | Sales | 5 |
| Dave | Sales | 6 |
| Edward | Office Staff | 6 |
| Francis | Production | 7 |
| Greg | Production | 5 |
| Henry | Production | 6 |
| Irene | Production | 5 |
| Joe | Sales | 5 |

To obtain an overview of the salaries, but at the same time meet the requirement to limit the size of a result set to five records, one can create a pseudo query such as "SELECT PERSON FROM SALARIES LIMIT 5". Such a query would return the first records from the table stored in the database, but arbitrarily leave out almost 50% of the total salary paid. Alternatively, one can arrange the query to return the top five largest salaries from the table stored in the database, but this would still leave out 45% of the total salary paid.

Further, for the example above, if the client system can only display at most seven (7) values simultaneously (because of screen size limits for example), a preferred level of detail would involve seven (7) items or less. In a case where more than seven (7) items are returned from the database system in response to a query, the additional information may not be desirable since it cannot be displayed by the client system.

Existing systems attempt to address such limitation in one of two ways:

(i) A query is formulated and the result set (i.e. retrieved information) is interpreted at the client system to see if it meets a predetermined level of detail. Based on the results of this interpretation, additional (altered) queries are formulated in an effort to obtain a preferred the desired level of detail in incremental steps.

(ii) Separate meta-data and data queries are sent to the database system. Based on their results, a final query/request is formulated which is predicted (but not always guaranteed) to provide information with the desired level of detail.

Both of these approaches (and their combinations) result in an undesirable processing overhead in terms of the number of queries transmitted and the amount of data that needs to be transferred between the server and the client system. Also, both require knowledge of data stored by the database system and metadata outside of the query engine. They are also limited in what they can achieve or predict.

SUMMARY

In one embodiment of the present invention, a method retrieves information from a database system. The method comprises: generating, by one or more processors, a data query comprising a specification of information to be retrieved from the database system; defining, by one or more processors, a first parameter specifying a condition to be met by the retrieved information; defining, by one or more processors, a second parameter specifying one or more data reduction operations to be executed if the condition defined by the first parameter is not met; and transmitting, by one or more processors, the generated data query and the first and second parameters to the database system.

In one embodiment of the present invention, a method provides information from a database system to a client system. The method comprises: receiving, by one or more processors, a data query defining a specification of information to be retrieved from the database system; receiving, by one or more processors, a first parameter specifying a condition to be met by retrieved information; receiving, by one or more processors, a second parameter specifying one or more data reduction operations to be executed if the condition defined by the first parameter is not met; identifying, by one or more processors, information of the database based on the one or more characteristics defined by the received data query; determining, by one or more processors, if the identified information meets the condition specified by the first parameter; and if it is determined that the identified information does not meet the condition specified by the first parameter, then executing, by one or more processors, a data reduction operation specified by the second parameter.

In one embodiment of the present invention, a system provides information from a database system to a client system. The system comprises: a processor, a computer readable memory, and a computer readable storage medium; first program instructions to receive a data query defining a specification of information to be retrieved from the database system; second program instructions to receive a first parameter specifying a condition to be met by retrieved information; third program instructions to receive a second parameter specifying one or more data reduction operations to be executed if the condition defined by the first parameter is not met; fourth program instructions to identify information of the database based on the one or more characteristics defined by the received data query; fifth program instructions to determine if the identified information meets the condition specified by the first parameter; and sixth program instructions to, in response to determining that the identified information does not meet the condition specified by the first parameter, execute a data reduction operation specified by the second parameter; and wherein the first, second, third, fourth, fifth, and sixth program instructions are stored on the computer readable storage medium and executed by the processor via the computer readable memory.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Proposed is a method which enables a client system to specify, together with a data query, a limitation on retrieved information (such as the number of data items to be returned, for example) along with a data reduction strategy that can be employed by a database system to meet the specified limitation.

The client system supplements a data query with the following two parameterized constructs:

(i) Conditions:

Conditions define what characteristics the query results (i.e. the retrieved information) should adhere to. These are typically parameterized in the query specification. By way of example, a condition could be that the number of rows returned from a database should be between five (5) and twenty (20). Other examples of conditions may place a limitation on: the number of rows returned; the number of distinct items returned for a particular column; the number of cells returned in a multidimensional query; the number of tuples on the edge of a multidimensional query; or the total number of bytes transferred. It will be appreciated that the above examples are not exhaustive, and other conditions which define characteristics of query results may be envisaged.

Multiple conditions may be combined logically, to achieve more complex conditioning of the query result. For example, an AND operator can indicate two conditions which have to meet simultaneously. Conditions may reference data and metadata in the query result, like for example a DistinctCount of a certain item. But conditions may also refer to query constructs and query result constructs, like tuples on rows in the result.

(ii) Data Reduction Strategy:

The data reduction strategy defines a number of data summarizing or abstracting operations and the logical order in which they should be applied. Implementation of these operations may achieve the information characteristics defined by the conditions. By way of example, a data reduction strategy could be aggregation over a data dimension.

Other data reduction strategies or data summarizing techniques are possible.

Application of data reduction operations proceeds in the specified order, until the query result matches the conditions or until no more operations can be applied.

There are many data reduction operations possible that an extended query language could support, depending on the underlying data, technology and implementation. Operations may include using a different aggregation level of the data, but also bucketing (grouping by value range), clustering (grouping based on data content), top/bottom (only displaying the top n and bottom n), rest thresholds (only show 20% of data and aggregate the rest under a new category called 'rest'), sampling ('returning a random subset of data'), or context filtering (only including the records that would best fit the user's profile). It will be appreciated that the above examples are not exhaustive, and other data reduction operations may be envisaged.

The two parameterized constructs may be changed so as to alter a level of detail of returned information. This makes it simple to adapt complex data interfaces to changing modalities. For example, when porting an existing interface to a mobile device, one can simply adapt a 'maximum items visible' parameter to a different number. In this way, it is not required to redefine all the queries or any program logic.

Upon receipt of the enhanced data query, the database system fetches the data items that the data query should return, determines if the fetched data meets the limitations imposed by the conditions specified by the enhanced data query and, if not, proceeds with the data reduction strategy specified by the enhanced data query. If no successful strategy can be applied (e.g. if data aggregation fails to result in data meeting the limitations imposed by the conditions), the database system may revert to a default data reduction operation (such as selecting a subset of the data for example).

Embodiments may be implemented by enhancing existing data retrieval systems in two places: the client system and the database system/server.

Client System Modifications:

On the client side, additional functionality may be added to parameterize a data query with conditions and data aggregation strategies. This may be accomplished by modifying an existing data query language with new language constructs that allow the additional parameters to be specified. Alternatively, the conditions and data aggregation strategies may be communicated as separate objects when the data query is passed to a database system/server for processing.

Server Modifications:

On the server side, logic may be added which is adapted to compare current query results against specified condition(s), for example by using available metadata. If a condition is met, the query result can be returned to the requesting client. If not, a first data reduction strategy is applied and the result is then re-evaluated. This process may be repeated with other data reduction operations until the results meet the specified conditions.

There may be cases where, after executing all data reduction operations defined by the data reduction strategy, the condition(s) is/are still not met. In such a situation, the last query result may be returned regardless, after which it is up to the consumer to decide what to do with the result. When the query result is returned, the consumer may be informed about the data reduction strategy applied and/or the data reduction operation(s) executed.

Figure 1:
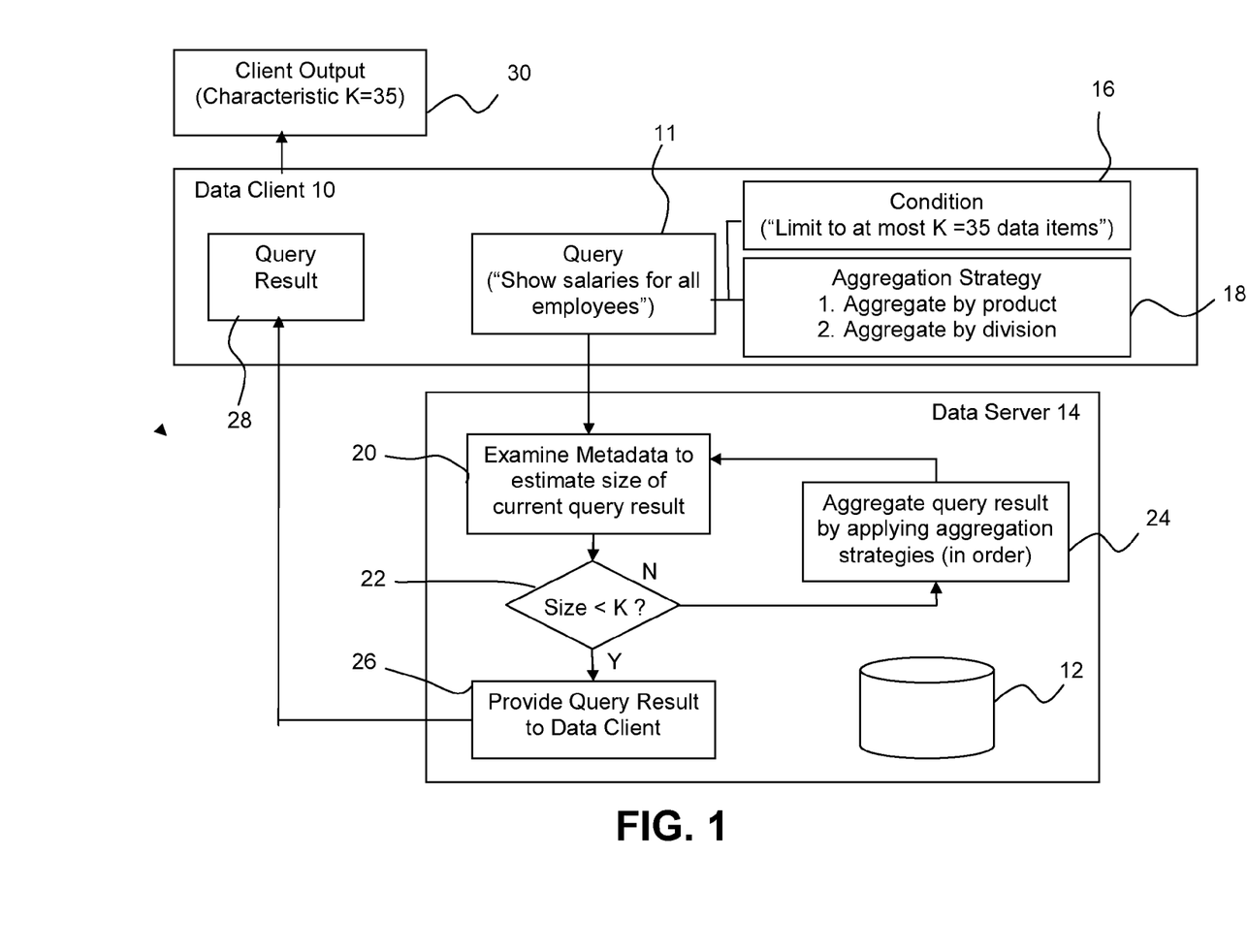
FIG. 1 is a flow diagram of a method according to an embodiment of the invention.

Referring now to FIG. 1, there is depicted a flow diagram of a method according to an embodiment of the invention.

The method comprises a data client 10 generating a data query 11 for retrieving information from a database 12 of a data server 14.

Firstly, the data client 10 defines a condition parameter 16 which specifies a condition to be met by retrieved information. The condition parameter 16 may represent a limitation imposed on retrieved information by the data client 10.

The data client also defines an aggregation strategy 18 which specifies data aggregation operations to be applied in case the potential information returned does not meet the limitation(s) imposed by the condition parameter 16.

The data client 10 then generates a data query 11 using a conventional database query language, such as SQL or MDX, or a custom code, and supplements the data query 11 with the condition 16 and aggregation strategy 18. In other words, the data client 10 generates an extended query 11 that not only comprises a data query construct but also comprises the condition 16 and aggregation strategy 18 constructs.

The generated data query 11 is transmitted to the data server 14 along with the condition 16 and aggregation strategy 18 parameters using an appropriate communication link. Here, this is done by sending the extended query which contains the condition 16 and aggregation strategy 18 parameters. However, it will be understood that in other embodiments where the condition 16 and aggregation strategy 18 parameters are separate from the data query 11, the query 11 and the condition 16 and aggregation strategy 18 parameters may be sent separately over the same or different communication links, for example.

After receiving the data query 11 along with the condition 16 and aggregation strategy 18 parameters, the data server 14 processes the data query 11 and examines 20 metadata of the database 12 to determine characteristics of the query result. The characteristics of the query results are then checked 22 against the condition parameter 16 to determine if the query results meet the limitation(s) imposed by the condition parameter 16.

If it is determined that the query result data does not meet the limitation(s) imposed by the condition parameter 16, a first data aggregation operation defined by the aggregation strategy parameter 18 is executed by the data server 14 so as to aggregate 24 the query result data. The data server 14 then examines 20 metadata of the newly aggregated query result to determine characteristics of the aggregated query result data and once again checks 22 the characteristics against the condition parameter 16 to determine if the aggregated query result data now meets the limitation(s) imposed by the condition parameter 16. Again, if is determined that the query result data does not meet the limitation(s) imposed by the condition parameter 16, a further data aggregation operation defined by the aggregation strategy parameter 18 is executed by the data server 14 so as to further aggregate 24 the query result data. This cycle of checking query result data characteristics against the condition parameter 16 and aggregating 24 the query result data in accordance with the aggregation strategy parameter 18 is repeated until is it determined that the query result data meets the limitation(s) imposed by the condition parameter 16.

If it is determined that the query result data (aggregated or not) meets the limitation(s) imposed by the condition parameter 16, the query result data is provided 26 to the data client 10. As a result of the processing undertaken by the data server 14, the query result 28 provided to the data client 10 may meet the limitation(s) imposed by the condition parameter 16 supplied with the data query 11. Thus, the data client 10 provides the query result 28 as a client output 30 having a characteristic which adheres to the limitation(s) imposed by the condition parameter 16.

Referring to the method illustrated in FIG. 1, we may now consider an example of the method wherein a simple MDX-like pseudo query language may be employed to retrieve data from the database 12 like as follows:
"SELECT Product ON ROWS, Sales ON COLUMNS FROM Database"

In this example, the query result will provide sales data for all products. However, it will not be known how many products will be returned until after the query has been executed. Thus, one may query metadata first, so as to establish the number of products in the database 12. Here, we assume the database 12 stores data relating to one hundred and fifty (150) products.

Now, if the technical limitations of the data client 10 are such that only data relating to forty (4) items can be displayed by the current user interface, returning data relating to all potential products would exceed the capabilities of the data client 10. However, if there are only thirty five (35) product groups, then that sales data per product group may be more desirable to obtain as a result. By supplementing the query 11 with additional parameter constructs, one can indicate such preferred information characteristics.

The query below is an example of an extended query construct according to an embodiment, although other implementations are possible:
   WITH PARAMETERS(MaxItems)
   SELECT Product ON ROWS, Sales ON COLUMNS
     FROM Database
   WITH CONDITION NumItems(ROWS)<=MaxItems
   USING OPERATIONS AggregateByHierarchy(Product, ProductGroup, ProductFamily), TopNRest(Products, MaxItems−1, Sales)

In the extended query above, the MaxItems parameter, stated in the "WITH PARAMETERS" part is used to define the maximum desired number of items in the query result.

The "WITH CONDITION" part informs the query engine of the condition that the number of products in the output should be equal or less than the number specified in the MaxItems parameter.

The "USING OPERATION" part defines which data aggregation strategies the query engine should employ if the number of items on the rows is exceeded as described in the condition part. In this case, the query engine is told to use aggregation over the product hierarchy, which contains the level ProductFamily, ProductGroup and Product. By aggregating one hundred and fifty (150) products to thirty five (35) product groups, the requirement of not showing more than forty (40) items may be met.

If the conditions under which the query needs to run now only allows twelve (12) items to be shown, for example because the size of the user interface available for display has changed, or the system now runs on a mobile device in a lower resolution, then the previous query result would still be too big. However, since the aggregation in the operation part has been specified to go up to ProductFamily, the query engine can continue with data aggregation. If there are only eight (8) product families in the data, it can further aggregate the individual data records and meet the new condition. If aggregation at the ProductFamily level still contains more than MaxItems, a secondary aggregation operation is executed that takes the Maxitems−1 number of products by Sales and groups the rest under a single item.

All of this logic may require no extra coding at the client side, because it is encapsulated in the client output characteristic (the number K in the flowchart of FIG. 1 for example). Thus, the entire data retrieval system may adapt to changing constraints at runtime.

Figure 2:
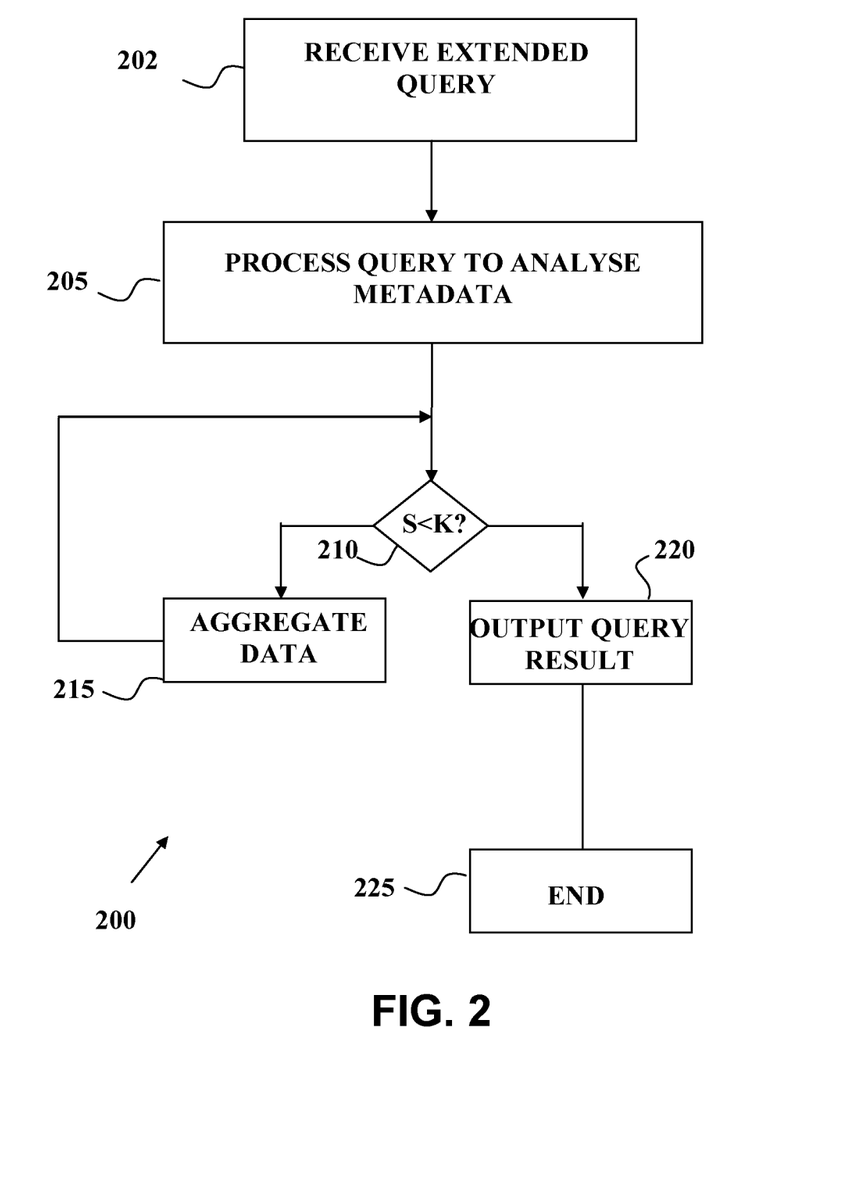
FIG. 2 is a flow diagram of a method for requesting information from a database system according to an embodiment of the invention.

Referring now to FIG. 2, there is shown a flow diagram of a method 200 of providing information from a database system to a client system according to an embodiment.

Firstly, in step 202, the database system receives an extended data query according to an embodiment from a client system. The extended data query defines one or more characteristics of information to be retrieved from the database system, much like a conventional data query. However, the extended data query also comprises first and second aggregation parameters. The first aggregation parameter specifies a condition to be met by retrieved information, and the second aggregation parameter specifies one or more data aggregation operations to be applied to information that does not meet the condition defined by the first aggregation parameter.

After receiving the extended data query in step 202, the database system continues to step 205 in which the database system processes the data query and examines metadata to determine characteristics of the information to be retrieved from the database system. In other words, the database system determines characteristics of the query result. Such determination may include actual execution of the query and examination of the results.

The determined characteristics of the query result (i.e. the information to be retrieved) are then checked against the condition specified by first aggregation parameter in step 210. This check is undertaken to determine if the characteristics of the query result meet the limitation(s) imposed by the first aggregation parameter. Here, by way of example, step 210 determines is the number of records S in the query result are less than a maximum number K of records to be returned to the client system (as defined by the first aggregation parameter).

If it is determined that the characteristics of the query result do not meet the limitation(s) imposed by the first aggregation parameter, the method proceeds to step 215 in which a first data aggregation operation (as defined by the second aggregation parameter) is executed by the database system so as to aggregate the data of query result. The method then returns to step 210 to determine if the characteristics of the newly aggregated data of the query result meet the limitation(s) imposed by the first aggregation parameter. If, in step 210, it is then determined that the newly aggregated data of the query result still does not meet the limitation(s) imposed by the first aggregation parameter, the method proceeds once again to step 215 in which a further data aggregation operation defined operation (as defined by the second aggregation parameter) is executed so as to further aggregate the data of the query result. This cycle of checking (step 210) the characteristics of the query result against the limitation(s) imposed by the first aggregation parameter and aggregating (step 215) the query result data in accordance with a aggregation strategy (as defined by the second aggregation parameter) is repeated until is it determined in step 210 that the query result data meets the limitation(s) imposed by the first aggregation parameter.

If it is determined (in step 210) that the query result data (aggregated or not) meets the limitation(s) imposed by the first aggregation parameter, the method proceeds to step 220 wherein the query result data (which meets the limitation(s) imposed by the first aggregation parameter) is provided to the client system. The method then ends in step 225.

Figure 3:
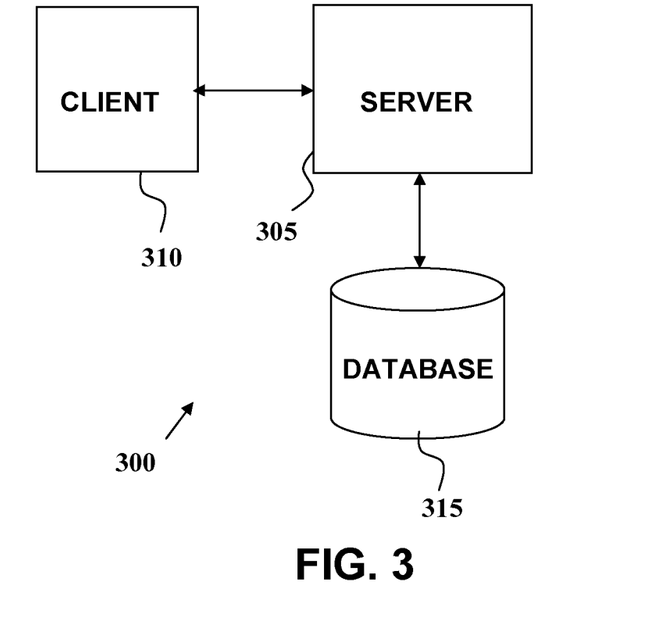
FIG. 3 is a schematic block diagram of a system according to an embodiment.

Referring now to FIG. 3, there is illustrated a schematic block diagram of a computer system 300 according to an embodiment. The computer system 500 is adapted to retrieve data from a database by employing adaptive data aggregation based on capabilities/limitations of a client. The system 300 comprises a server 305 having a communication interface adapted to receive a data query from a client 310, and a data storage unit 315 connected to the server 305.

The data storage unit 315 is adapted to store data in the form of a database. In other words, the data storage unit 315 is adapted to store information in a structured format which can be described as a database.

The server 305 comprises a processing unit which is adapted to execute a computer program which, when executed, causes the system to implement the steps of a method according to an embodiment, for example the steps as shown in FIG. 2.

The server 305 is adapted to receive, via its input interface, a data query along with first and second aggregating parameters. The first and second aggregating parameters define a condition and aggregating strategy, respectively.

The server 305 process the received data query along with first and second aggregating parameters to identify information in the data storage unit 315 which may be returned to the client 310 as a query result. However, before transmitting the identified information to the client 310, the server 305 determines if the identified information adheres to the condition defined by the first aggregating parameter. If the server 305 determines that the identified information does not meet the condition defined by the first aggregating parameter, the server 305 executes a data aggregation operation in accordance with the data aggregation strategy defined by the second aggregating parameters. Such data aggregation operations are executed in accordance with the data aggregation strategy until the condition defined by the first aggregating parameter is met by the aggregated data.

Data which meets the condition defined by the first aggregating parameter is then transmitted from the server 305 to the client 310.

The server 305 thus retrieves data from the database 315 and employs adaptive data aggregation based on capabilities/limitations of the client 310. This ensures that data provided to the client 310 in response to a query meets capabilities/limitations of the client 310.

It will be appreciated that in instead of a simple projection of a subset of data for example, a query result provided by an embodiment of the invention may be a function of the requirements of the overall system. This, for example, may be used to retrieve a desired number of items in the output for which a user interface is designed to render.

Embodiment may enable a level of detail provided by query results to be directly, consistently and efficiently influenced from the client-side. This may offer significant improvements in performance, as level of detail determination happens closer to the data and can take advantage of dedicated data structures in the data source and query engine itself. In addition, a desired level of detail can be obtained using a single supplemented query (instead of multiple queries as required by conventional approaches) which may provide improved consistency of data and may prevent locking the data between queries.

Furthermore, embodiments may enable logic and strategy regarding a desired level of detail to be directly embedded in a data query, with specific requirements being defined by embedded. This may allow the creation and storage of data queries independently from program code. This may be advantageous for maintainability, as well as the speed of development of systems. No code changes may be needed to maintain, test or create queries according to embodiment of the invention.

Embodiments may thus provide an apparatus and method for retrieving data from a database system which employs adaptive data aggregation based on limitations that are specified in conjunction with a request to retrieve data.

It will be clear to one of ordinary skill in the art that all or part of the method of one embodiment of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to one embodiment of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

As presented herein and in one embodiment of the present invention, a method for retrieving information from a database system employs adaptive data reduction based on client-side capabilities.

Data aggregation is a process in which information is gathered and expressed in a summary form. By imposing limits on returned data and providing a database system with preferred data aggregation methods at query time, proposed embodiments enable the database system to dynamically apply data aggregation methods to return data that meets the imposed limits whilst not misrepresenting the data.

A client system may thus specify, together with a data query, a limitation on retrieved information and one or more strategies that the database system can employ to reduce the information in order to meet the specified limitation. In other words, data request/query constructs may be employed which allow adaptive data reduction to be supported. Such constructs may enable data reduction to be undertaken by the database system based on information provided by a data request/query.

According to an aspect of the invention there is provided a method for retrieving information from a database system.

Embodiments may enable the retrieval of a data subset which provides an accurate representation of an entire dataset, wherein the level of detail is automatically adapted depending on the capabilities on a requesting client system.

In an embodiment, the method may further comprise defining a replacement parameter specifying a revised condition to be met by retrieved information; and transmitting the replacement parameter to the database system According to another aspect of the invention, there is provided a method of providing information from a database system to a client system.

The data query may be represented in a database query language such as SQL or MDX, or in custom code.

In one embodiment, if, after executing all of the one or more data aggregation reduction operations defined by the first aggregation parameter, it is determined that the identified information does still not meet the specified condition, a default data reduction operation may be executed.

According to yet another aspect of the present invention, there is provided a computer system adapted to retrieve information from a database system.

The flowchart and block diagram in the above figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments have been illustrated in detail, one of ordinary skill in the art will appreciate that modifications and adaptations to those embodiments may be made.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A method for retrieving information from a database system, the method comprising:
   generating, by one or more processors, a data query comprising a specification of information to be retrieved from the database system;
   defining, by one or more processors, a first parameter specifying a condition to be met by the retrieved information;

defining, by one or more processors, a second parameter specifying one or more data reduction operations to be executed in response to the condition defined by the first parameter not being met, wherein said one or more data reduction operations summarize data using multiple data summarizing operations in a logical order that is defined by a data reduction strategy, wherein the one or more data reduction operations comprise:
- a data aggregation operation,
- a data clustering operation,
- a grouping of value ranges operation,
- a top/bottom display operation in which only a top section and a bottom section of the data is displayed,
- a rest threshold display operation in which only a predefined percentage of the data is displayed and a remainder of the data is aggregated under a new category entitled "rest",
- a sampling operation that returns a random subset of the data, and
- a context filtering operation that presents only records from the data that fit a user's profile in accordance with a predefined matching limit; and transmitting, by one or more processors, the generated data query and the first and second parameters to the database system.

2. The method of claim 1, further comprising:
defining, by one or more processors, a replacement parameter specifying at least one of:
- a revised condition to be met by retrieved information, and
- one or more revised data reduction operations to be executed in response to a condition defined by the first parameter or the replacement parameter not being met; and transmitting, by one or more processors, the replacement parameter to the database system.

3. A method of providing information from a database system to a client system, the method comprising:
receiving, by one or more processors, a data query defining a specification of information to be retrieved from the database system;
receiving, by one or more processors, a first parameter specifying a condition to be met by retrieved information;
receiving, by one or more processors, a second parameter specifying one or more data reduction operations to be executed in response to the condition defined by the first parameter not being met, wherein said one or more data reduction operations summarize data using multiple data summarizing operations in a logical order that is defined by a data reduction strategy, wherein the one or more data reduction operations comprise:
- a data aggregation operation,
- a data clustering operation,
- a grouping of value ranges operation,
- a top/bottom display operation in which only a top section and a bottom section of the data is displayed,
- a rest threshold display operation in which only a predefined percentage of the data is displayed and a remainder of the data is aggregated under a new category entitled "rest",
- a sampling operation that returns a random subset of the data, and
- a context filtering operation that presents only records from the data that fit a user's profile in accordance with a predefined matching limit;

identifying, by one or more processors, information from the database system based on one or more characteristics defined by the received data query;
determining, by one or more processors, whether the identified information meets the condition specified by the first parameter; and
in response to determining that the identified information does not meet the condition specified by the first parameter, executing, by one or more processors, a data reduction operation specified by the second parameter, wherein the data reduction operation summarizes the information to be retrieved from the database system using the multiple data summarizing operations in the logical order that is defined by the data reduction strategy.

4. The method according to claim 3, wherein at least one of the first and second parameters is integrated as part of the data query.

5. The method according to claim 3, wherein at least one of the data query, the first parameter, and the second parameter is represented in a database query language.

6. The method according to claim 3, wherein the condition places a limitation on:
- an amount of information to be retrieved,
- a total data size of information to be retrieved,
- a quantity of distinct items to be retrieved,
- a quantity of cells to be returned in a multidimensional query, and
- a quantity of tuples on an edge of a multidimensional query.

7. The method according to claim 3, further comprising:
determining, by one or more processors, that the data query is transmitted from a mobile device, wherein the mobile device has a display screen than has less than a predefined display area; and
in response to determining that the data query is transmitted from the mobile device having the display screen that has less than the predefined display area, reducing a level of detail of the information to be retrieved from the database system for transmission to and display on the display screen.

8. The method according to claim 3, further comprising:
in response to determining, after executing all of the one or more data reduction operations defined by a first aggregation parameter, that the identified information does still not meet the specified condition, executing, by one or more processors, a default data reduction operation.

9. The method according to claim 3, further comprising:
receiving, by one or more processors, a replacement parameter specifying a revised condition to be met by retrieved information;
identifying, by one or more processors, information from the database system based on the one or more characteristics defined by the received data query;
determining, by one or more processors, whether the identified information meets the revised condition specified by the replacement parameter; and
in response to determining that the identified information does not meet the condition specified by the replacement parameter, executing, by one or more processors, a data reduction operation specified by the second parameter.

10. The method according to claim 3, wherein the database system is provided on a non-transitory computer readable medium.

11. The method according to claim 3, wherein the database system is provided on a network-accessible data repository.

12. A system for providing information from a database system to a client system, the system comprising:
- a processor, a computer readable memory, and a non-transitory computer readable storage medium;
- first program instructions to receive a data query defining a specification of information to be retrieved from the database system;
- second program instructions to receive a first parameter specifying a condition to be met by retrieved information;
- third program instructions to receive a second parameter specifying one or more data reduction operations to be executed in response to the condition defined by the first parameter not being met, wherein said one or more data reduction operations summarize data using multiple data summarizing operations in a logical order that is defined by a data reduction strategy, wherein the one or more data reduction operations comprise:
  - a data aggregation operation,
  - a data clustering operation,
  - a grouping of value ranges operation,
  - a top/bottom display operation in which only a top section and a bottom section of the data is displayed,
  - a rest threshold display operation in which only a predefined percentage of the data is displayed and a remainder of the data is aggregated under a new category entitled "rest",
  - a sampling operation that returns a random subset of the data, and
  - a context filtering operation that presents only records from the data that fit a user's profile in accordance with a predefined matching limit;
- fourth program instructions to identify information from the database system based on one or more characteristics defined by the received data query;
- fifth program instructions to determine whether the identified information meets the condition specified by the first parameter; and
- sixth program instructions to, in response to determining that the identified information does not meet the condition specified by the first parameter, execute a data reduction operation specified by the second parameter, wherein the data reduction operation summarizes the information to be retrieved from the database system using the multiple data summarizing operations in the logical order that is defined by the data reduction strategy; and wherein the first, second, third, fourth, fifth, and sixth program instructions are stored on the non-transitory computer readable storage medium and executed by the processor via the computer readable memory.

13. The system according to claim 12, wherein at least one of the first and second parameters is integrated as part of the data query.

14. The system according to claim 12, wherein at least one of the data query, the first parameter, and the second parameter is represented in a database query language.

15. The system according to claim 12, wherein the condition places a limitation on at least one of:
- an amount of information to be retrieved,
- a total data size of information to be retrieved,
- a quantity of distinct items to be retrieved;
- a quantity of cells to be returned in a multidimensional query, and
- a quantity of tuples on an edge of a multidimensional query.

16. The method of claim 3, further comprising:
repeatedly performing, by one or more processors, the data reduction operation specified by the second parameter until the condition specified by the first parameter is met, wherein the condition specified by the first parameter is to return all information for a particular type of data, wherein the data reduction operation reduces said all information for the particular type of data into a reduced format that a first display on a first system that transmitted the data query is capable of displaying upon receipt.

17. The system according to claim 12, further comprising
seventh program instructions to, after executing all of the one or more data reduction operations defined by the first aggregation parameter, determine that the identified information still does not meet the specified condition; and
eighth program instructions to, in response to determining that the identified information still does not meet the specified condition, execute a default data reduction operation; and wherein the seventh and eighth program instructions are stored on the non-transitory computer readable storage medium and executed by the processor via the computer readable memory.

18. The method of claim 16, further comprising:
determining, by one or more processors, that the information is to be transmitted to a second system that has a second display that is smaller than the first display of the first system that transmitted the data query; and
repeatedly performing, by one or more processors, the data reduction operation specified by the second parameter until the second display is capable of displaying the information in a new reduced format.

* * * * *